(12) United States Patent
Chen

(10) Patent No.: US 7,004,414 B2
(45) Date of Patent: Feb. 28, 2006

(54) BLADE FOR FOOD PROCESSORS

(76) Inventor: Mei Chi Chen, 4th Fl., No. 81, San-Chang Street, San-Chong, Taipei Hsien (TW)

( * ) Notice: Subject to any disclaimer, the term of this patent is extended or adjusted under 35 U.S.C. 154(b) by 172 days.

(21) Appl. No.: 10/770,455

(22) Filed: Feb. 4, 2004

(65) Prior Publication Data
US 2005/0167537 A1 Aug. 4, 2005

(51) Int. Cl.
B02C 18/16 (2006.01)
(52) U.S. Cl. ................... 241/292.1; 241/282.1
(58) Field of Classification Search ........... 241/292.1, 241/282.1, 282.2, 273.2, 273.1
See application file for complete search history.

(56) References Cited

U.S. PATENT DOCUMENTS

| | | | | |
|---|---|---|---|---|
| 582,014 A | * | 5/1897 | Gilmore | 241/95 |
| 2,154,650 A | * | 4/1939 | Wishinsky | 241/273.2 |
| 2,546,739 A | * | 3/1951 | Georgeina et al. | 241/199.11 |
| 3,137,333 A | * | 6/1964 | Nishina | 241/273.2 |
| 3,882,912 A | * | 5/1975 | Sybertz | 144/172 |
| 4,344,581 A | * | 8/1982 | Redemann | 241/88.4 |
| 4,556,175 A | * | 12/1985 | Motoyama et al. | 241/57 |
| 5,296,265 A | * | 3/1994 | Okuma et al. | 427/213 |
| 5,405,095 A | * | 4/1995 | Lesar | 241/82.5 |
| 5,537,918 A | * | 7/1996 | Patel et al. | 99/510 |
| 5,918,822 A | * | 7/1999 | Sternby | 241/46.17 |

* cited by examiner

Primary Examiner—Derris H. Banks
Assistant Examiner—Faye Francis
(74) Attorney, Agent, or Firm—Rosenberg, Klein & Lee

(57) ABSTRACT

A blade for food processors is provided on at least one surface with a plurality of spaced cutting teeth, which are slantingly or perpendicularly projected from the surface of the blade. Each of the cutting teeth includes a substantially pyramidal projection and a substantially triangular shallow recess located in front of the pyramidal projection. When the blade is mounted in mixer, juicer, or other types of food processors, the cutting teeth cooperate with serrated edges of the blade to very quickly cut, grate, grind, and press fruit or food to produce highly fine granules and juice.

2 Claims, 5 Drawing Sheets

BLADE FOR FOOD PROCESSORS

FIELD OF THE INVENTION

The present invention relates to a blade for food processors, and more particularly to a blade for food processors enabling quick cutting, grating, grinding, and pressing of food to produce highly fine granules and juice.

BACKGROUND OF THE INVENTION

The blades, either two or four pieces, mounted in mixers, juicers, or other types of food processors generally include only sharp edges for cutting. There is not any other means provided on the blades to produce enhanced cutting, grating, grinding, and/or pressing effect. Therefore, a considerably long time is needed by mixers, juicers, etc. using the conventional blades to fully cut, grate, and ground food, particularly hard food, such as nuts, and food containing coarse fibers.

SUMMARY OF THE INVENTION

The primary object of the present invention is to provide a blade for food processors that enables quick and thorough cutting, grating, grinding, and pressing of food to be processed.

To achieve the above and other objects, the blade for food processors according to the present invention is characterized in a plurality of spaced cutting teeth slantingly or perpendicularly projected from at least one surface of the blade. Each of the cutting teeth includes a substantially pyramidal projection and a substantially triangular shallow recess located in front of the pyramidal projection. When the blade is mounted in a mixer, juicer, or other types of food processors, the cutting teeth cooperate with serrated edges of the blade to very quickly cut, grate, grind, and press fruit or food to produce highly fine granules and juice.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figures 1, 1A:
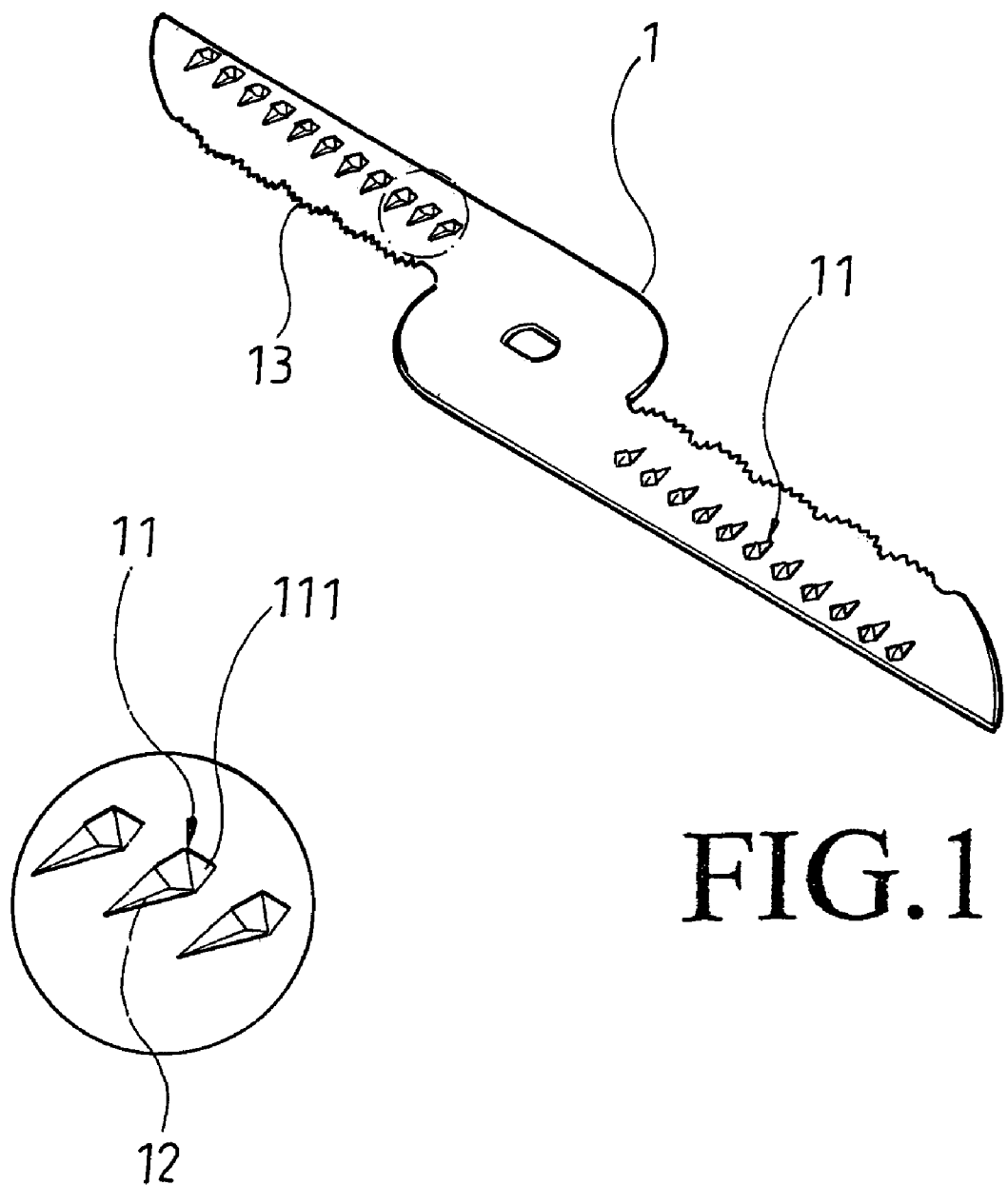
FIG. 1 is a perspective view of a blade for food processors according to a preferred embodiment of the present invention.
FIG. 1A is an enlarged view of cutting teeth provided on the blade of the present invention.

Please refer to FIG. 1 that is a perspective view of a blade 1 according to a preferred embodiment of the present invention for using on various kinds of food processors. The blade 1 may be of any shape and is provided on at least one surface with a plurality of spaced cutting teeth 11, which may be slantingly or perpendicularly projected from the surface of the blade 1. Please refer to FIG. 1A that is an enlarged perspective view of the cutting teeth 11. As shown, each of the cutting teeth 11 includes a substantially pyramidal projection 111 and a substantially triangular shallow recess 12 located in front of the pyramidal projection 111. When one or more blades 1 are mounted in a mixer, juicer, or other types of food processors, serrated edges 13 of the blade 1 and the cutting teeth 11 provide double cutting actions to cut, grate, grind, and press fruit or food, so that the fruit or food is more quickly and thoroughly processed.

Figure 2:
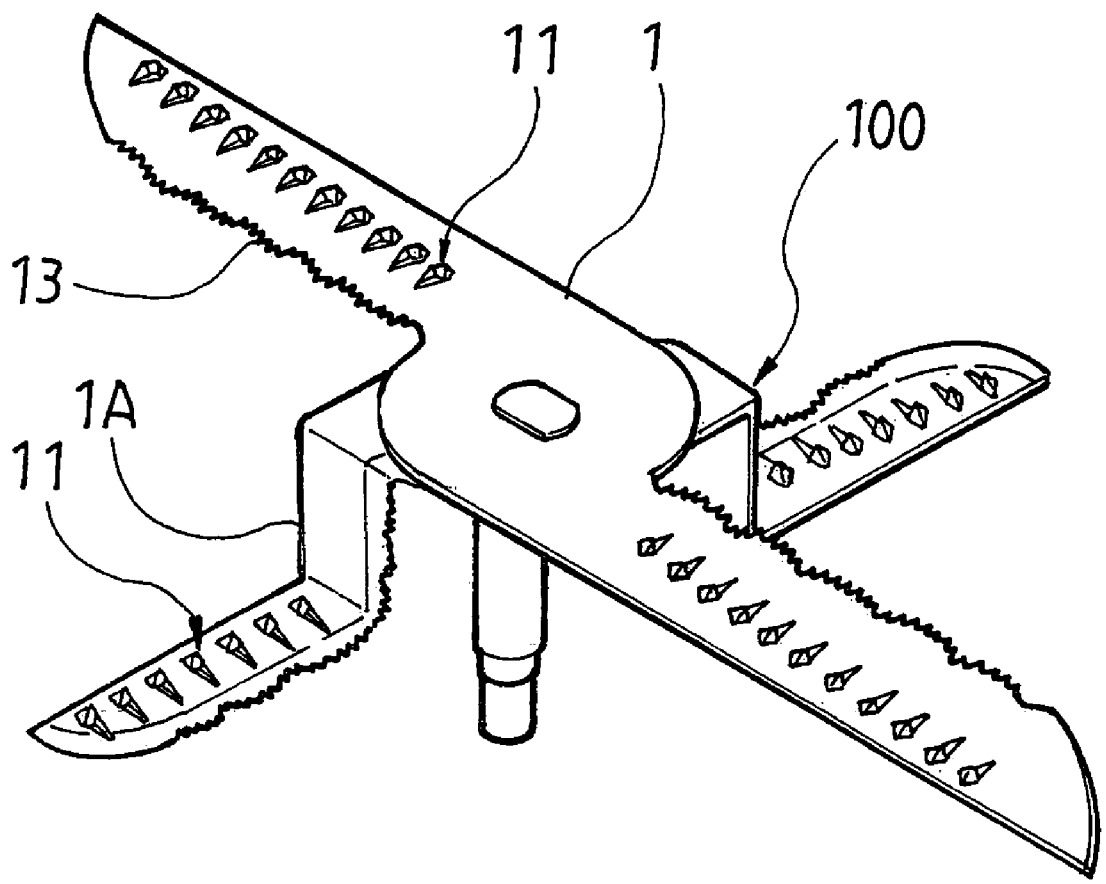
FIG. 2 is a perspective view showing a cross blade assembly formed from two pieces of the blades of FIG. 1.
Figure 3:
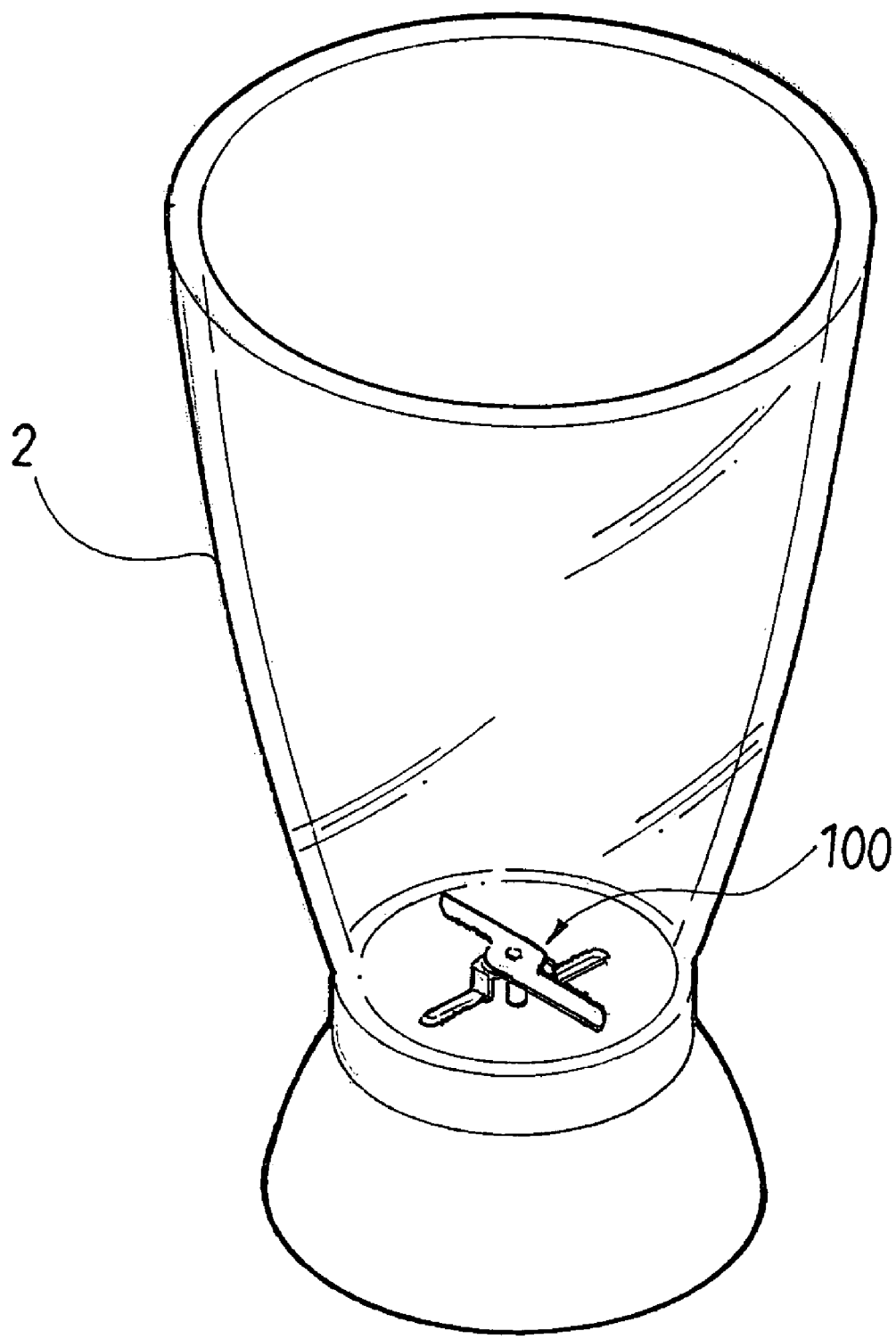
FIG. 3 is a perspective view showing the use of the cross blade assembly of FIG. 2 on a mixer.

Please refer to FIGS. 2 and 3 at the same time. In practical use of the blade 1 of the present invention, two pieces of the blades 1 and 1A are assembled to form a cross blade assembly 100, which is then mounted in the mixer or juicer or other food processor 2. When the cross blade assembly 100 is rotated, the serrated edges 13 and the cutting teeth 11 on the surface of the blades 1, 1A quickly and thoroughly cut various kinds of food, fruit, or vegetable to produce highly fine pieces and juice.

Figure 4:
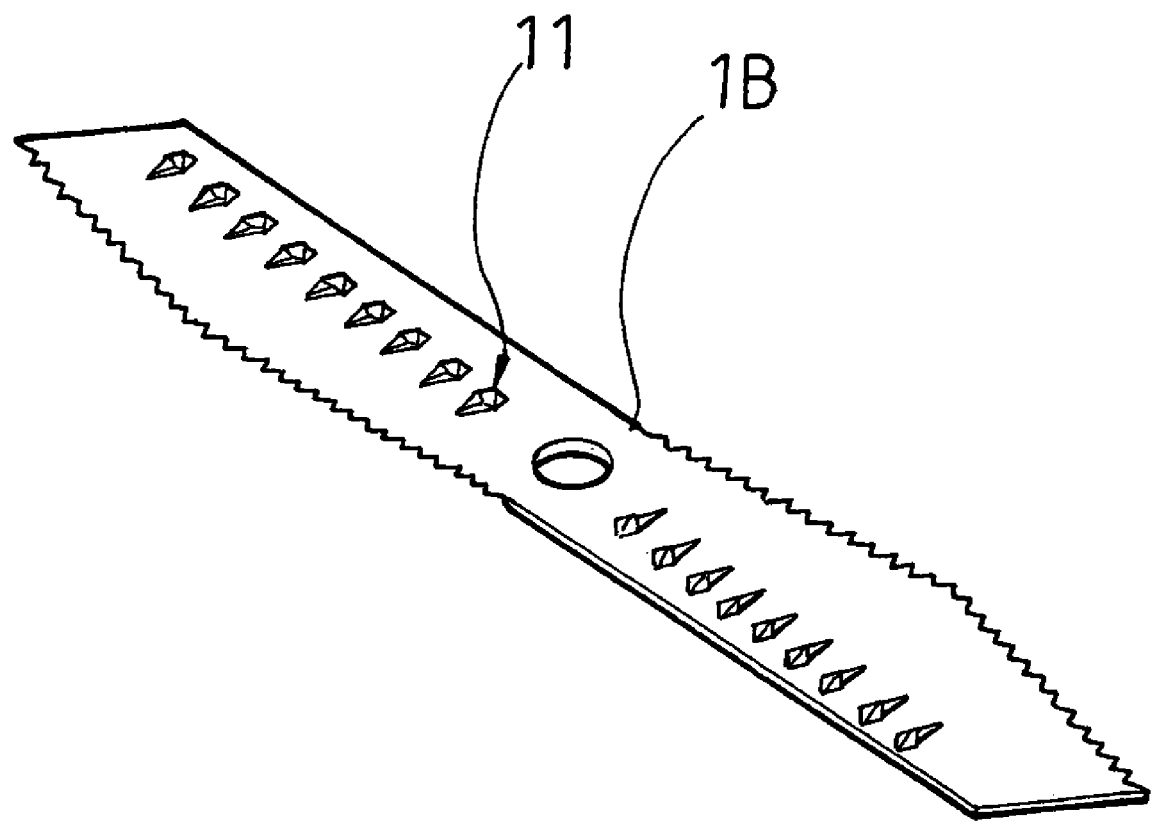
FIGS. 4 and 5 show another two embodiments of the present invention.
Figure 5:
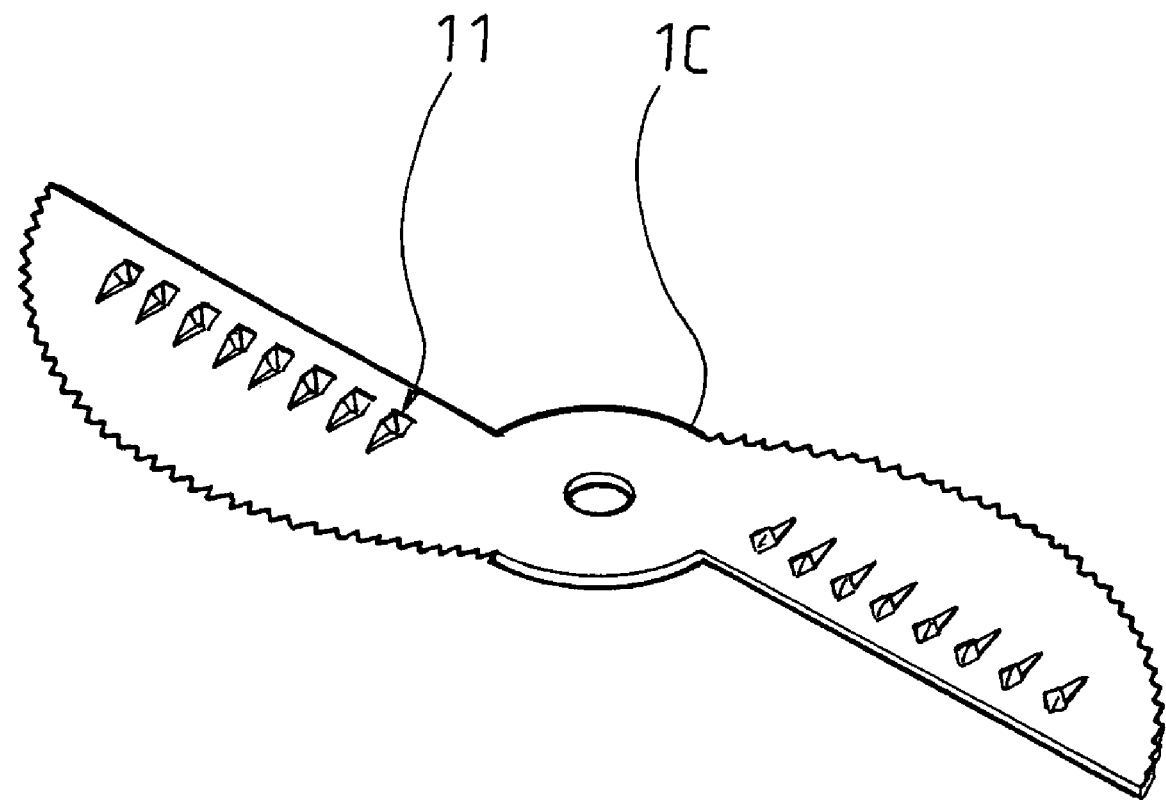

FIGS. 4 and 5 illustrate two further embodiments of the blade 1 showing different configurations. The blade 1B of FIG. 4 has a polygonal contour, and the blade 1C of FIG. 5 has curved serrated edges. Either the blade 1B or 1C may have the cutting teeth 11 provided on one or two surfaces thereof to provide multiple cutting, grating, grinding, and pressing functions.

The blade for food processor according to the present invention has at least the following advantages:

1. The cutting teeth 11 may be provided on one or two surfaces of the blade 1 to provide three-dimensional and multi-functional cutting and grinding of food at even faster speed.
2. The serrated edges 13 and the three-dimensional cutting teeth 11 of the blade 1 produce multiple water flows in the food processor to facilitate finely cutting, grating, and grinding of some hard food, such as nut, or food containing coarse fibers.
3. The three-dimensional cutting teeth 11 enable the mixer or juicer to crash ice cubes into highly fine and soft granules.
4. The blade 1 is able to cut, grate, grind, and press the food at the same time and can therefore largely reduce the time needed to process the food.
5. The blade 1 may be used to cut a variety of foods, such as vegetable, fruit, cereals, and even fish, shrimp, and meat.

In brief, the blade 1 of the present invention is useful in effectively producing fresh and healthy liquid-state food.

What is claimed is:

1. A blade for food processors, comprising a blade body of any shape having serrated edges and a plurality of cutting teeth spaced on at least one surface of said blade body; each of said cutting teeth including a pyramidal projection and a substantially triangular shallow recess located in front of said cutting tooth; whereby said serrated edges and said cutting teeth simultaneously cut, grate, grind, and press various kinds of food, including hard nuts and food containing coarse fibers, to quickly produce juice and highly fine granules.

2. The blade for food processors as claimed in claim 1, wherein said cutting teeth are slantingly or perpendicularly projected from said surface of said blade.

* * * * *